C. B. SHELDON.
Furniture Casters.

No. 137,728. Patented April 8, 1873.

Witnesses:
G. Mathey.
Solon C. Kemon

Inventor:
Cevedra B. Sheldon
Per
Attorneys.

UNITED STATES PATENT OFFICE.

CEVEDRA B. SHELDON, OF NEW YORK, N. Y.

IMPROVEMENT IN FURNITURE-CASTERS.

Specification forming part of Letters Patent No. 137,728, dated April 8, 1873; application filed March 29, 1873.

*To all whom it may concern:*

Be it known that I, CEVEDRA B. SHELDON, of New York, in the county of New York and State of New York, have invented a new and useful Improvement in Furniture-Casters; and I do hereby declare the following to be a full, clear, and exact description of the same, reference being had to the accompanying drawing forming part of this specification, in which—

Figure 1:
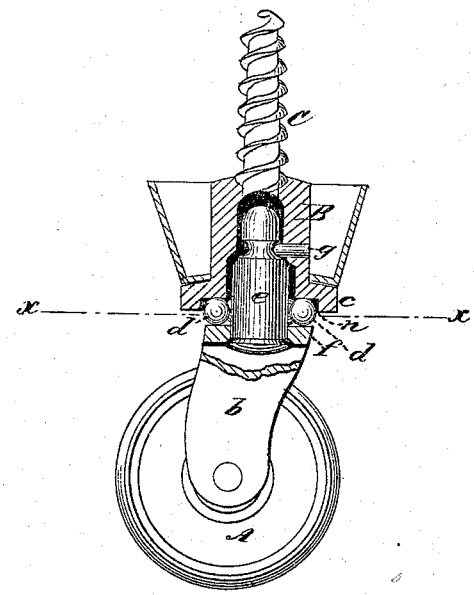
Figure 2:
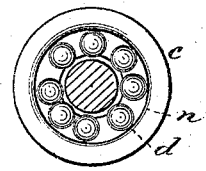

Figure 1 is a side elevation, partly in section, and Fig. 2 a horizontal section, through line $x$ $x$ of Fig. 1.

The invention relates to casters for furniture and other purposes, and is an improvement upon the subject-matter of a former patent granted to me, the general idea being unchanged from the device therein described; but the particular means by which the same is carried out being made much more simple and less expensive to the manufacturer, as well as to the public.

A is a caster-wheel, journaled in the horns $b$, which are of the usual construction. B is a socket, provided at bottom with milled head $c$, and at top with an ordinary gimlet-pointed wood-screw, C, by means of which the caster is attached to the leg or bottom of the article of furniture to which it is desired to apply it. The interior of the socket at bottom is provided with an annular recess, $n$, into which are placed a series of balls, $d$, which lie in close contact with both the stem $e$ and top plate $f$ of the horns, and thus receive both the vertical and horizontal strain that is put upon the caster. The caster-wheel is prevented from becoming detached from the socket when the article of furniture to which the caster is applied is lifted from the floor by a pin, $g$, in the socket entering a circular cavity in the upper end of the stem $e$.

The leg to which the caster is applied may or not, as may be desired, be covered by a ferrule, which is struck up out of sheet metal, and provided with a hole in the bottom of it, through which the socket is screwed into the leg.

By the above-described construction of caster, the movable balls will, equally with those of my former patent, prevent sliding friction and insure a distribution of strain, requiring, however, much fewer balls and but one set of them, while the whole structure can be manufactured at less cost.

Having thus described my invention, what I claim as new, and desire to secure by Letters Patent, is—

The socket B, provided at top with the gimlet-pointed wood-screw C, and at bottom with the internal annular recess $n$, in combination with the plate $f$ of the horns $b$, stem $e$, and balls $d$, the latter being arranged in the cup-shaped annular recess, so as to be in close contact with both the stem $e$ and plate $f$, as and for the purpose specified.

CEVEDRA B. SHELDON.

Witnesses:
T. DURBIN D. OURAND,
CHAS. A. PETTIT.